Jan. 27, 1970   SHIGERU MATSUBARA ET AL   3,492,067
FILM PROJECTOR
Filed Sept. 21, 1966

INVENTORS
SHIGERU MATSUBARA
YOSHIAKI NAKAYAMA

BY Semmes & Semmes

ATTORNEYS

United States Patent Office 3,492,067
Patented Jan. 27, 1970

3,492,067
FILM PROJECTOR
Shigeru Matsubara, Kawasaki, Kanagawa, and Yoshiaki Nakayama, Tokyo, Japan, assignors to Fuji Shashin Film Kabushiki Kaisha, Kanagawa, Japan, a corporation of Japan
Filed Sept. 21, 1966, Ser. No. 581,014
Claims priority, application Japan, Sept. 24, 1965, 40/58,411
Int. Cl. G03b *31/00, 1/00, 31/02*
U.S. Cl. 352—12
1 Claim

ABSTRACT OF THE DISCLOSURE

A sound motion picture projector has a stabilizing fly wheel positioned between the film driving sprockets. Two pressure rollers are mounted adjacent the fly wheel for maintaining the film in contact with the fly wheel. The pressure rollers are mounted on shafts extending from two L-shaped arms. The shaft supporting one of the L-shaped arms also supports an arm bearing a sound head for movement to and from an operating position. A single control shaft carries a plurality of cams for synchronously energizing the drive motor and projection light and moving the pressure rollers and sound head to and from operating position.

---

The interval between the picture frame of an 8-mm cinema film and the sound track corresponding thereto was relatively great in the past, for example 56 frames. However of late the standard of short intervals, for example 18 frames, has been set by the requirements in the compilation of films and simultaneous recording. In projecting while carrying out sound recording or regenerating by the use of a film of this standard, the sound is degraded because the sound recording or regenerating mechanism near the picture frame is fed intermittently. In order to remove this shortcoming, there may be provided a loop of film between an aperture and stabilizer and a stabilizer having a large inertia may be employed. In conventional apparatus, however, the use of a large inertia stabilizer has bad effects upon a film, since the stabilizer is not stopped immediately after the feeding of the film is stopped.

The object of the present invention is thus concerned with a motion picture projector wherein the above described disadvantages can be overcome.

In the improved projector of the present invention, the quality of sound is upgraded by the use of a stabilizer having a large inertia flywheel without bad effects upon a film and by controlling the lighting of a projection lamp, normal and reverse rotating of the film and sound recording and regenerating with one control dial.

Other objects of the present invention will become apparent from the ensuing specification and attached drawings wherein.

Figure 1:
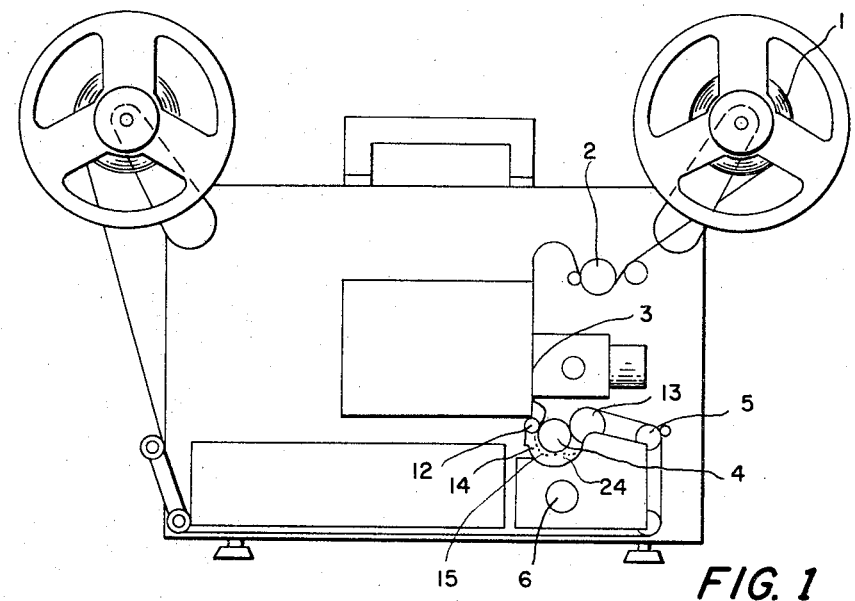
FIG. 1 is a side view of the projector of the present invention.
Figure 2:
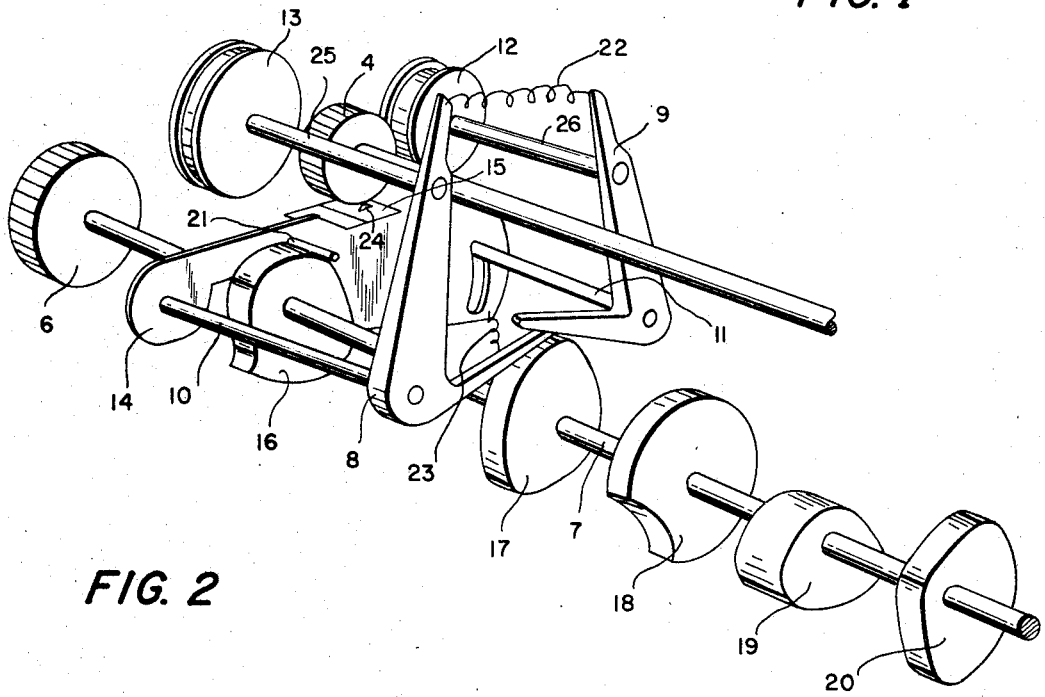
FIG. 2 is a perspective view of the stabilizer assembly of the present invention.

Reference numeral 1 designates motion picture film; 2 a first sprocket gear for driving the film 1; 3 an aperture; 4 a stabilizer interlocked with a large inertia flywheel; 5 a second sprocket gear; 6 a control dial adapted to operate the normal rotating, reverse rotating and stopping of the film, the lighting on and off of a lamp, and the change of recording and regenerating through a shaft, the dial being fixed to a shaft 7; 8 and 9 L-type levers moving reciprocatedly on shafts 10 and 11 fitted to a casing of the projector. To the ends of the levers 8 and 9, facing each other, are provided, respectively, film pressing rollers 12 and 13 respectively mounted upon shafts 26 and 25 each rotating and pressing the film 1 to the stabilizer 4 and having flanges to guide the film, the rollers being pressed to the stabilizer through a tension spring 22 and the other ends of the levers overlapping and engaging each other. Numeral 14 is a plate lever secured to shaft 10 and reciprocating about shaft 11. Plate lever 14 has a stud or projection 21 and is drawn downwards by a spring 23. A magnetic head 15 is secured to the lever 14 via a plate spring 24 and brought into contact with a sound recording zone on the film 1 fed along the stabilizer 4, when the lever 14 is pivoted against the spring 23. A shaft 7 is fixedly provided with cams 16–20. Cam 17 engages overlapping portions of the levers 8 and 9. Cam 16 engages the projection 21 of the lever 14 and cams 18, 19 and 20 may engage the switches for normal and reverse rotation of a motor and for lighting the lamp for projection.

When the dial 6 is set on "OFF," the overlapping portions of the levers 8 and 9 are lifted by the cam 17 and the pressing rollers 12 and 13 are separated from the stabilizer 4 while resisting spring 22. The projection 21 of the lever 14 is not lifted by the cam 16, so there is formed a large gap between the magnetic head 15 and stabilizer 4 by the spring 23. The cams 18–20 do not operate the switches. At this time, a film 1 is charged. When the dial 6 is then set to "Normal Rotation" from "OFF," firstly the switch is on through the cam 18 to rotate the motor and the film 1 is conveyed in the normal direction by means of the sprocket gears 2 and 5, and claw (not shown). Then, the overlapping portions of the levers 8 and 9 are lowered by a concave portion of the cam 17 and the action of spring 22; the film pressing rollers 12 and 13 press the film 1 to the stabilizer 4 and the stabilizer 4 begins to rotate through the film 1 driver. Finally, the projection 21 of the lever 14 is thrust up against the force of the spring 23 by a convex portion of the cam 16 and the magnetic head 15 is brought into tight contact with a sound recording zone of the film 1 revolving at a constant rate in tight contact with the stabilizer 4, whereby the re-recording of sounds is carried out. The dial 6 being rotated further in the same direction, projection lamp is switched on through the cam 20 and the projection of the film 1 starts.

When the dial 6 is then rotated in the reverse direction from this normal rotation state, there occurs the reverse action up to "OFF," but the rollers 12 and 13 pressing the film 1 to the stabilizer are separated before the stopping of the film feed. Therefore, even though the stabilizer 4, having a large inertia, continues rotating after the stopping of the film feed, the stabilizer 4 and film 1 are separated by a loop present between the aperture 3 and stabilizer 4, whereby the film 1 is protected from obstacles. The dial being rotated further to "Reverse Rotation," the switch is on for inversion of the phase of the power source of the motor through the cam 19, the motor is switched on through the cam 18, the film 1 travels in the reverse direction and the lamp for projection is lighted by the cam 20. When the dial 6 is returned to "OFF," each switch is restored to the former state in reverse order to the foregoing.

It will be understood by the above description that in accordance with the present invention, good quality sounds can be obtained by the use of a stabilizer having a large inertia flywheel, the film 1 does not undergo unnatural forces from the stabilizer continuing to rotate by the inertia even though the film feed is stopped, and moreover, various operations after charging a film can be effected by rotating one dial 6.

We claim:
1. In a film projector of the type having a film driving motor and a film stabilizer rotatably mounted on a shaft intermediate the film driving sprockets and a control drive shaft controlling the film drive, the improvement comprising:
  (A) a pressure roller mounted upon a pivotable shaft adjacent said stabilizer;
  (B) a magnetic sound head mounted on a pivotable arm adjacent said stabilizer;
  (C) a control shaft having:
    (i) a first cam for engaging the film driving motor switch and
    (ii) a second cam engaging an extension from said pivotable shaft to pivot said pressure roller towards said stabilizer and urge said film against said stabilizer as said driving motor is activated, and to pivot said pressure roller away from said stabilizer as said film driving motor is stopped, and
    (iii) a third cam engaging a projection from said pivotable arm for pivoting said magnetic sound head toward said stabilizer upon energization of the film driving motor and for pivoting the sound head away from said stabilizer upon de-energization of the drive motor.

References Cited

UNITED STATES PATENTS

| | | | |
|---|---|---|---|
| 1,806,744 | 5/1931 | De Forest | 352—12 |
| 1,885,900 | 11/1932 | De Forest | 352—19 X |
| 2,676,023 | 4/1954 | Isom | 352—29 |
| 2,974,840 | 3/1961 | Kuhnert | 352—173 X |
| 3,233,510 | 2/1966 | Harrison | 352—12 X |

FOREIGN PATENTS

| | | |
|---|---|---|
| 481,231 | 8/1929 | Germany. |
| 652,625 | 11/1937 | Germany. |

NORTON ANSHER, Primary Examiner

M. H. HAYES, Assistant Examiner

U.S. Cl. X.R.

352—29, 178